United States Patent

Maslov et al.

(10) Patent No.: US 6,762,525 B1
(45) Date of Patent: Jul. 13, 2004

(54) CASCADED ROTARY ELECTRIC MOTORS HAVING AXIAL AND RADIAL AIR GAPS

(75) Inventors: Boris A. Maslov, Reston, VA (US); Zareh Sogomonian, Sterling, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 70 days.

(21) Appl. No.: 10/180,011

(22) Filed: Jun. 26, 2002

Related U.S. Application Data

(63) Continuation-in-part of application No. 10/134,425, filed on Apr. 30, 2002.

(51) Int. Cl.[7] .......................... H02K 3/00; H02K 21/00; H02K 21/12
(52) U.S. Cl. ...................... 310/112; 310/216; 310/218; 310/267; 310/268; 310/156.38
(58) Field of Search .......................... 310/67 R, 75 R, 310/268, 254, 216, 218, 166, 168, 259, 112, 114, 156.38, 267

(56) References Cited

U.S. PATENT DOCUMENTS

| | | | |
|---|---|---|---|
| 4,754,207 A | 6/1988 | Heidelberg et al. ......... 310/254 |
| 4,786,834 A | 11/1988 | Grant et al. ................. 310/194 |
| 4,864,176 A | * 9/1989 | Miller et al. ................. 310/194 |
| 5,365,137 A | * 11/1994 | Richardson et al. ........ 310/258 |
| 5,625,241 A | * 4/1997 | Ewing et al. .......... 310/156.37 |
| 5,786,645 A | * 7/1998 | Obidniak .................. 310/68 R |
| 5,894,902 A | * 4/1999 | Cho ........................... 180/65.6 |
| 6,323,576 B1 | * 11/2001 | Applegate .................... 310/268 |
| 6,346,759 B1 | * 2/2002 | Suzuki et al. ............... 310/254 |
| 6,384,496 B1 | 5/2002 | Pyntikov et al. .......... 310/68 B |
| 6,617,746 B1 | * 9/2003 | Maslov et al. .............. 310/254 |

* cited by examiner

*Primary Examiner*—Tran Nguyen
(74) *Attorney, Agent, or Firm*—McDermott, Will & Emery

(57) ABSTRACT

A cascaded motor arrangement is configured with a plurality of rotor/stator sets that extend in an axial direction. A stator set contains a plurality of separate electromagnet core segments disposed coaxially about an axis of rotation. The core segments may be affixed, without ferromagnetic contact with each other, to a non-ferromagnetic support structure. A rotor set is configured in a U-shaped annular ring that at least partially surrounds the annular stator set and may define two parallel axial air gaps between the rotor and stator respectively on opposite axial sides of the stator and at least one radial air gap. Permanent magnets are distributed on each inner surface of the U-shaped rotor annular ring that faces an air gap. A winding is formed on a core portion that links axially aligned stator poles to produce, when energized, magnetic poles of opposite polarity at the pole faces.

12 Claims, 12 Drawing Sheets

CASCADED ROTARY ELECTRIC MOTORS HAVING AXIAL AND RADIAL AIR GAPS

RELATED APPLICATIONS

This application is a continuation-in-part of copending U.S. application Ser. No. 10/134,425, of Maslov et al., filed Apr. 30, 2002. This application also contains subject matter related to copending U.S. application Ser. No. 09/826,423 of Maslov et al., filed Apr. 5, 2001, copending U.S. application Ser. No. 09/826,422 of Maslov et al., filed Apr. 5, 2001, copending U.S. application Ser. No. 09/966,101 of Maslov et al., filed Oct. 1, 2001, copending U.S. application Ser. No. 10/067,305, of Maslov et al., filed Feb. 7, 2002, and copending U.S. application Ser. No. 10/134,365, of Maslov et al., filed Apr. 30, 2002, all commonly assigned with the present application. The disclosures of these applications are incorporated by reference herein.

FIELD OF THE INVENTION

The present invention relates to rotary electric motors, more particularly to motors having a plurality of cascaded pairs of permanent magnet rotor annular rings and stator annular rings, each pair having a plurality of axial air gap flux paths between the rotor and stator elements.

BACKGROUND

The above-identified copending related U.S. applications describe formation of electromagnet core segments as isolated magnetically permeable structures configured in an annular ring. Isolation of the electromagnet core segments permits individual concentration of flux in the magnetic cores, with a minimum of flux loss or deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group. Further benefits are described from utilization of three dimensional aspects of motor structure, such as a structural configuration wherein axially aligned stator poles and axially aligned rotor magnets provide highly concentrated flux distribution. Such configuration provides a greater number of poles with the same individual active air gap surface areas and/or greater total active air gap surface area than conventional motors having the same air gap diameter.

In summary, concentration of flux, maximization of flux, minimization of flux loss and transformer interference effects, are all contributing factors in the attainment of efficient motor operation with high torque capability. Motor structural configurations in which multiple poles are in axial alignment to provide efficient operation at high torque output have been described in the above-identified copending applications. Such arrangements, due to the relatively great volume occupied by the large number of stator core elements and rotor poles, are advantageous for use in environments in which space and weight considerations are not at a premium. There is a continuing need for motor structural configurations that provide these improved attributes as well as economy of size and geometry.

The above-identified copending Maslov et al. application Ser. No. 10/134,365, addresses these needs by development of motor structural configurations to increase the surface areas of opposing stator poles and rotor poles across a plurality of air gaps. The relatively larger surfaces in which flux can be concentrated promote high torque capacity. These concepts are further structurally developed in the present invention.

DISCLOSURE OF THE INVENTION

Advantages of the present invention are achieved, at least in part, by increasing those surface areas of stator and rotor elements that interact to produce electromotive force. The structural features of one such configuration of the invention are embodied in a motor that comprises a rotor and a stator in which a plurality of separated electromagnet core segments are disposed coaxially about an axis of rotation. The stator core segments form an annular stator ring bounded by an inner and outer diameter. The core segments are affixed, without ferromagnetic contact with each other, to a non-ferromagnetic support structure.

The rotor is configured in an annular ring that at least partially surrounds the annular stator to define a radial air gap and a pair of axial air gaps through which flux paths are produced to generate electromotive force. The rotor ring is formed of magnetically permeable material with a U-shaped cross-sectional configuration having sides joined by a cross wall. A plurality of permanent magnets is distributed along inner surfaces of the rotor sides and cross wall, thereby facing the two axial air gaps and the radial air gap. The permanent magnets successively alternate in polarity along the circumference of the rotor ring surfaces. The permanent magnets on the two side walls are respectively in axial alignment with each other and have opposite magnetic polarities. Each relatively flat permanent magnet is a magnetic dipole having one magnetic polarity at its surface facing an air gap and the opposite magnetic polarity at its surface mounted to the side wall or cross wall. The permanent magnets mounted on the side walls thus have magnetic polar orientation in the axial direction while the permanent magnets mounted on the cross wall have magnetic polar orientation in the radial direction.

Each stator electromagnet core segment comprises a pair of poles aligned in a direction generally parallel to the axis of rotation and joined by a ferromagnetic connecting portion having a winding formed thereon. Each stator electromagnet pole may be of a generally rectangular configuration, viewed in a cross-section taken in a plane parallel to the axis of rotation. The pole thus has a first pole surface, generally perpendicular to the axis of rotation and facing one of the axial air gaps, and a second surface facing the radial air gap. The winding, when energized, produces magnetic poles of opposite polarity at the two poles of the pole pair. A change in the direction of current effects a reversal of these magnetic polarities.

In one embodiment of the invention, the plurality of permanent magnets on the cross wall comprises two sets of magnets that are in axial alignment with each other and the magnets on the side walls. Each pair of adjacent side wall magnets and cross wall magnets are of the same magnetic polarity and opposite to the pair of side wall magnets and cross wall magnets located at the axially opposite side. When the winding of a stator electromagnet is energized in the vicinity of a set of aligned side wall and cross wall magnets, opposite magnetic polarities are formed in the electromagnet poles. The adjacent side wall and cross wall magnets aid each other in the production of either attractive or repulsive forces with respect to the stator poles that face the magnets across the axial and radial air gaps. Flux distribution is improved by the concentration of flux through the increased surfaces of the stator poles and rotor magnets, while minimizing stray flux.

In a beneficial variation of the above described motor structure, each stator pole face has an L-shaped cross sectional pole configuration, one portion of the "L" facing a rotor side wall across an axial air gap and the other portion of the "L" facing, at the outer stator diameter, the rotor cross wall across the radial air gap. In this arrangement, the stator pole surface area for flux distribution can be increased by the L extension of the radial surface, while maintaining the dimension of the connecting portion between poles that accommodates the winding.

As a further variation of the present invention, each adjacent pair of side wall and cross wall permanent magnets may be replaced with a single permanent magnet that has an L-shaped cross-sectional configuration. The magnet is mounted at inner surfaces of the corner junction of a side wall and the cross wall to provide maximum flux distribution. The magnet is a dipole having the same magnetic polarity on both inner surfaces. The magnet thus has two inner surfaces, each interactively facing a surface of a respective stator pole.

Advantages of the present invention can be realized with cascaded motors that incorporate the various structural features described above. One such cascaded motor configuration may contain a plurality of rotor annular rings centered about an axis of rotation and axially adjacent each other, each ring having disposed therein a plurality of permanent magnets. A plurality of stator annular rings are respectively in concentric alignment with, and at least partially surrounded by, the rotor rings. Each stator ring contains separated electromagnet core segments disposed coaxially about the axis of rotation. Two axial air gaps are formed between each stator ring and its respective rotor ring. Each rotor annular ring has a U-shaped cross section with two side walls connected by a cross wall, an inner surface of each of the side walls having permanent magnet surfaces facing one of the axial air gaps. Each stator core segment comprises a pair of poles integrally aligned by a linking portion, upon which a winding is formed, and having pole surfaces facing the axial air gaps.

Axially adjacent rotor annular rings of the cascaded motor may be in contact with each other and share a common side wall of magnetically permeable material. Permanent magnets on opposite surfaces of the common side wall are of opposite magnetic polarity and aligned with each other in a direction substantially parallel to the axis of rotation. Additional permanent magnets may be circumferentially distributed on an inner surface of at least one rotor cross wall to face stator pole surfaces across an annular radial air gap that separates the rotor cross wall from a stator annular ring. The permanent magnets on the cross wall form two sets of magnets, the magnets of each set being adjacent to, and in axial alignment with, permanent magnets on a respective side wall, adjacent side magnets and cross wall magnets being of the same magnetic polarity. The permanent magnets on the cross wall may be separated from or integral with the adjacent permanent magnets on the respective side walls to form L-shaped in cross-sections. The stator poles may have rectangular or L-shaped cross-sections.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
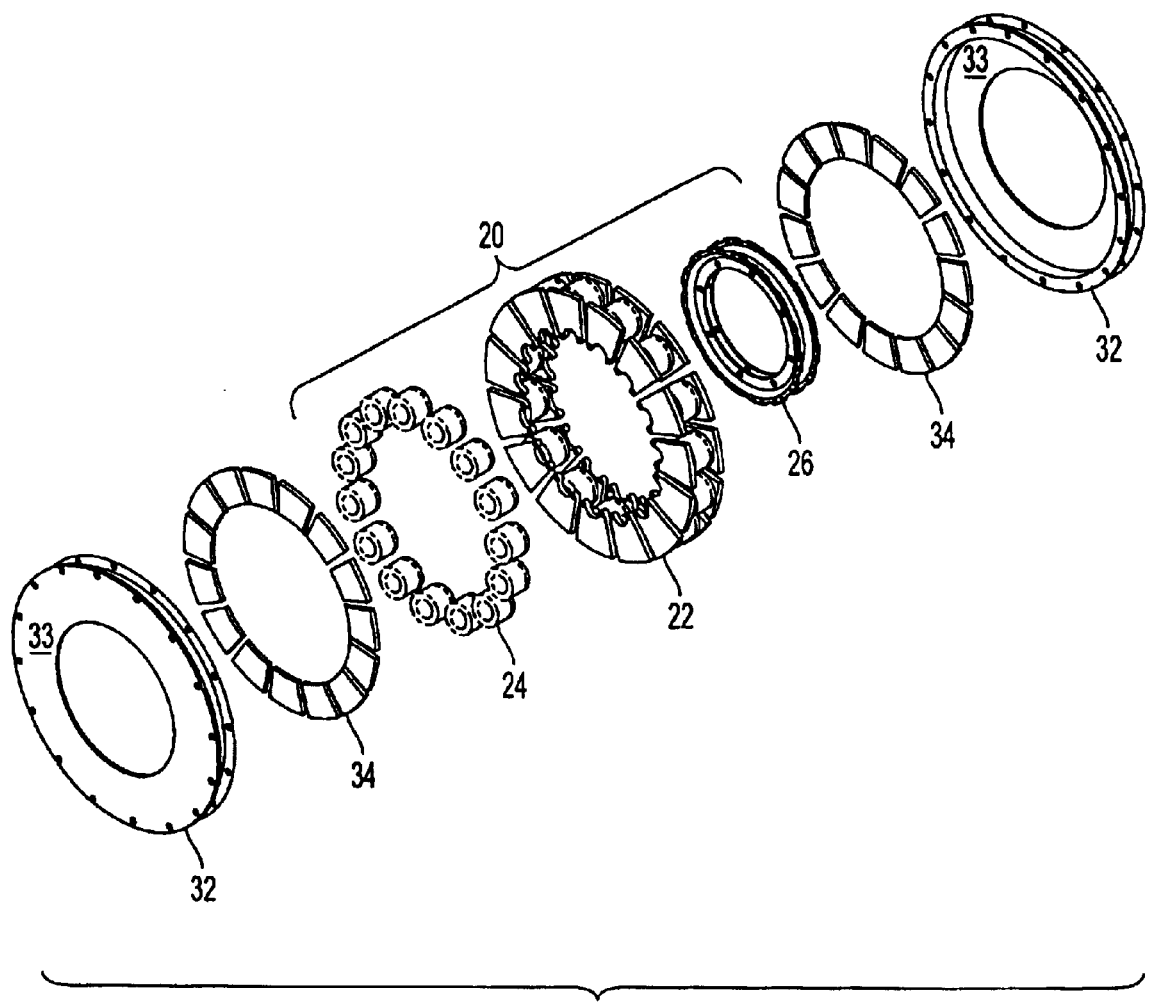
FIG. 1 is an exploded view illustrating motor components of one embodiment of the present invention.

FIG. 1 is a three-dimensional exploded view illustrating components of one embodiment of the invention. The components in combination form the assembled motor construction illustrated in FIG. 2. For simplicity of explanation, elements that are not necessary for understanding the present invention have not been illustrated. Reference is made to the aforementioned copending applications for a more detailed description of such features. The elements indicated by bracket 20, when assembled, form a stator annular ring that is centered about an axis of rotation. The stator ring comprises a plurality of ferromagnetically isolated electromagnets having core portions 22 upon which are to be formed windings 24. Non-ferromagnetic ring 26 is a support structure for the individual electromagnets. A more detailed illustration of the stator ring construction is provided in FIG. 4. Rotor sections 32 and permanent magnets 34, when assembled, form an annular ring centered about the axis of rotation and at least partially surrounding the stator ring.

Figure 2:
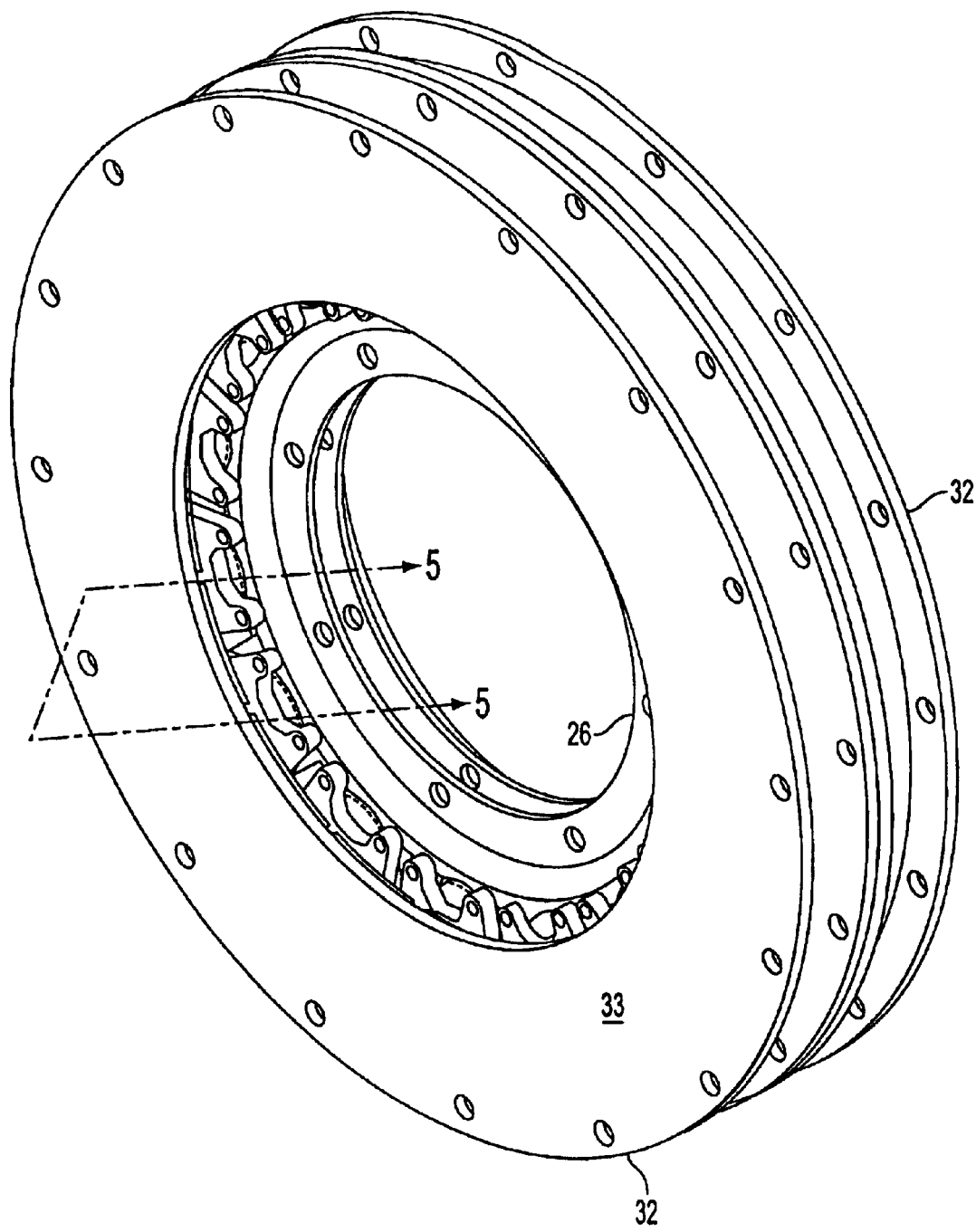
FIG. 2 is a three-dimensional perspective view of the motor elements of FIG. 1 in an assembled state.

The stator and rotor rings are shown in their assembled state in the three-dimensional perspective view of FIG. 2. Each rotor section 32 is generally in the shape of an open cylinder having an axis coincident with the axis of rotation. A disk shaped end wall 33, substantially perpendicular to the axis, extends between an inner and outer diameter. A tubular edge wall is oriented in the axial direction. The end wall extends beyond the outer diameter of the edge wall by a flange portion. A similar inner flange extends outwardly from the opposite axial side of the edge wall. Both flanges having through holes distributed near their peripheries. The through holes of the inner surface flanges of each of the rotor sections 32 are in alignment for attachment of the rotor sections to each other by any conventional means, the edge walls thereby forming a cross wall of a U-shaped cross section. The through holes of the outer flanges enable attachment of the rotor ring to plates, not shown, to be coupled with a shaft at the axis of rotation.

Figure 3:
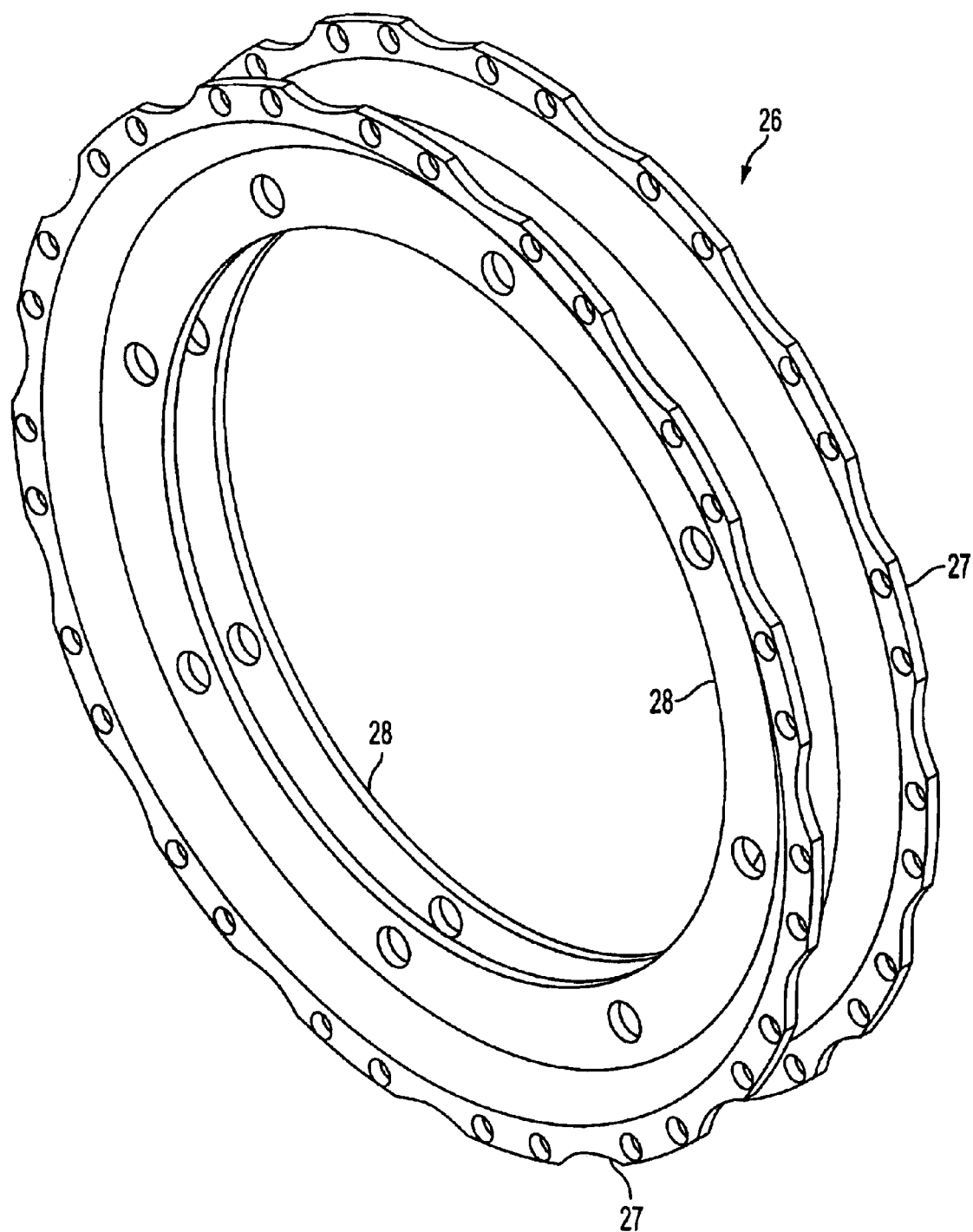
FIG. 3 is a three-dimensional perspective view of stator ring support structure for the arrangement of FIG. 2.

The stator support ring 26, shown in the three-dimensional perspective view of FIG. 3, is an axially disposed cylinder having at each end a radially outward flange 27 and a radially inward flange 28. Flange 27 has regularly spaced protrusions, each containing a pair of through holes 25. The axial spacing between flanges 27 is set to accommodate the stator electromagnet core elements 22. Lower flange 28, which has a generally circular periphery, has through holes 29 that are used for mounting the ring to an appropriate stationary structure. The number and location of the through holes in flange 28 can be adjusted to coordinate with a mounting arrangement for attachment thereto in a conventional manner.

Figure 4:
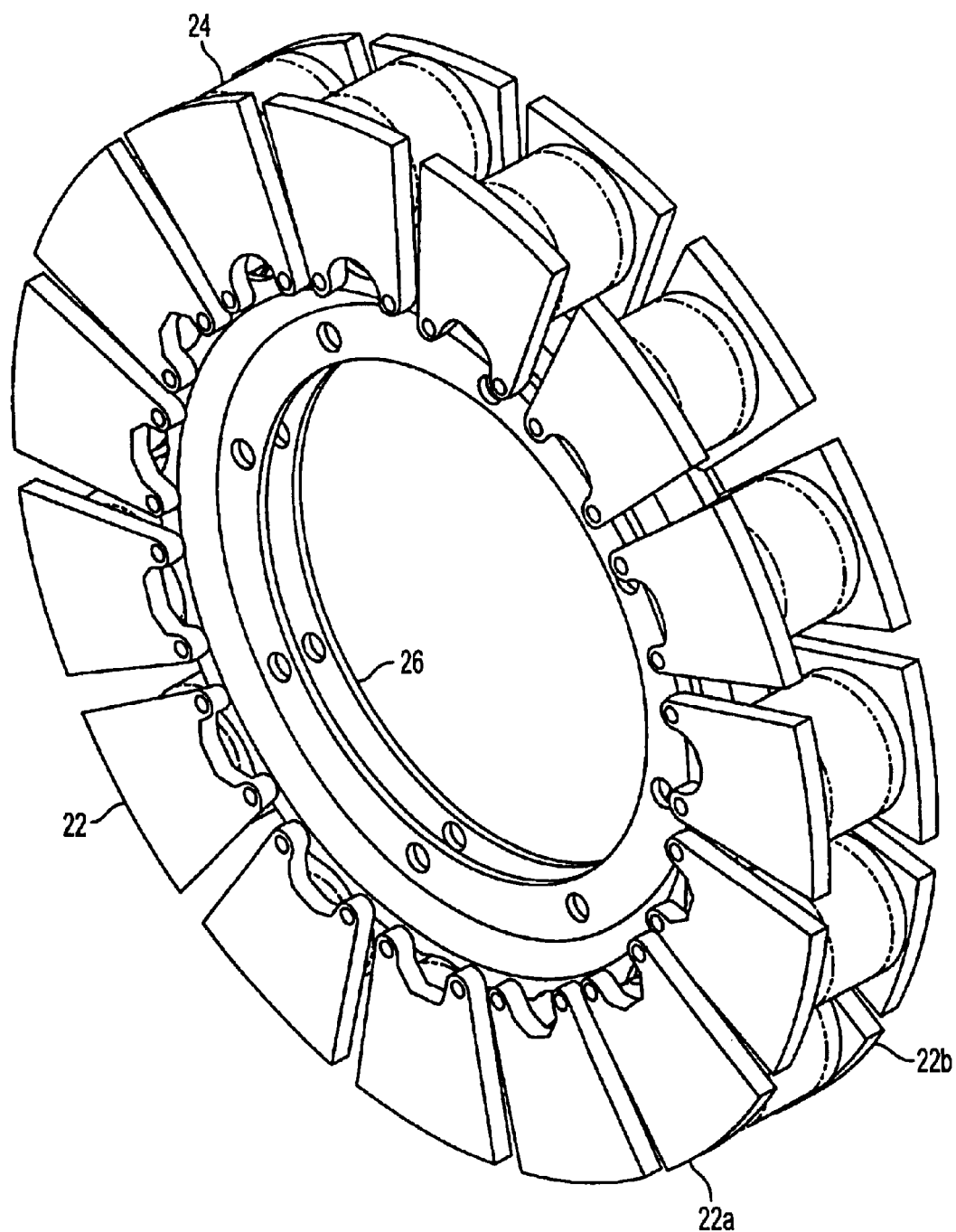
FIG. 4 is a three-dimensional perspective view of the stator core elements of FIG. 2 in combination with the support structure of the present invention.

As shown in FIG. 4, each of the stator electromagnet core elements is configured with an axially aligned pole pair 22a and 22b, having pole faces that lie substantially in radial planes. Through holes are provided at the base of each pole for alignment with the through holes in the flanges 27 of ring 26. Each core element is mounted via the through holes at the base of the poles to an aligned protrusion on each of the flanges 27. The electromagnet elements are separated from direct contact with each other. The clearance between adjacent electromagnets may be varied to reduce the cross-talk (transformer effect) between magnetic circuits. Ring 26 is formed of non-ferromagnetic material, such as aluminum. In operation, each electromagnet thus forms a flux path that is independent and isolated from the flux paths of other electromagnets.

In the preferred implementation, the stator is joined to a stationary shaft. The rotor, which at least partially surrounds the stator, is coupled to the shaft through appropriate interconnecting structure and bearings. It is within the contemplation of the invention, however, that the shaft instead may be fixed to the rotor and, therefore, rotatable. In the latter arrangement the shaft would be coupled to the stator supporting structure through bearings.

Figure 5:
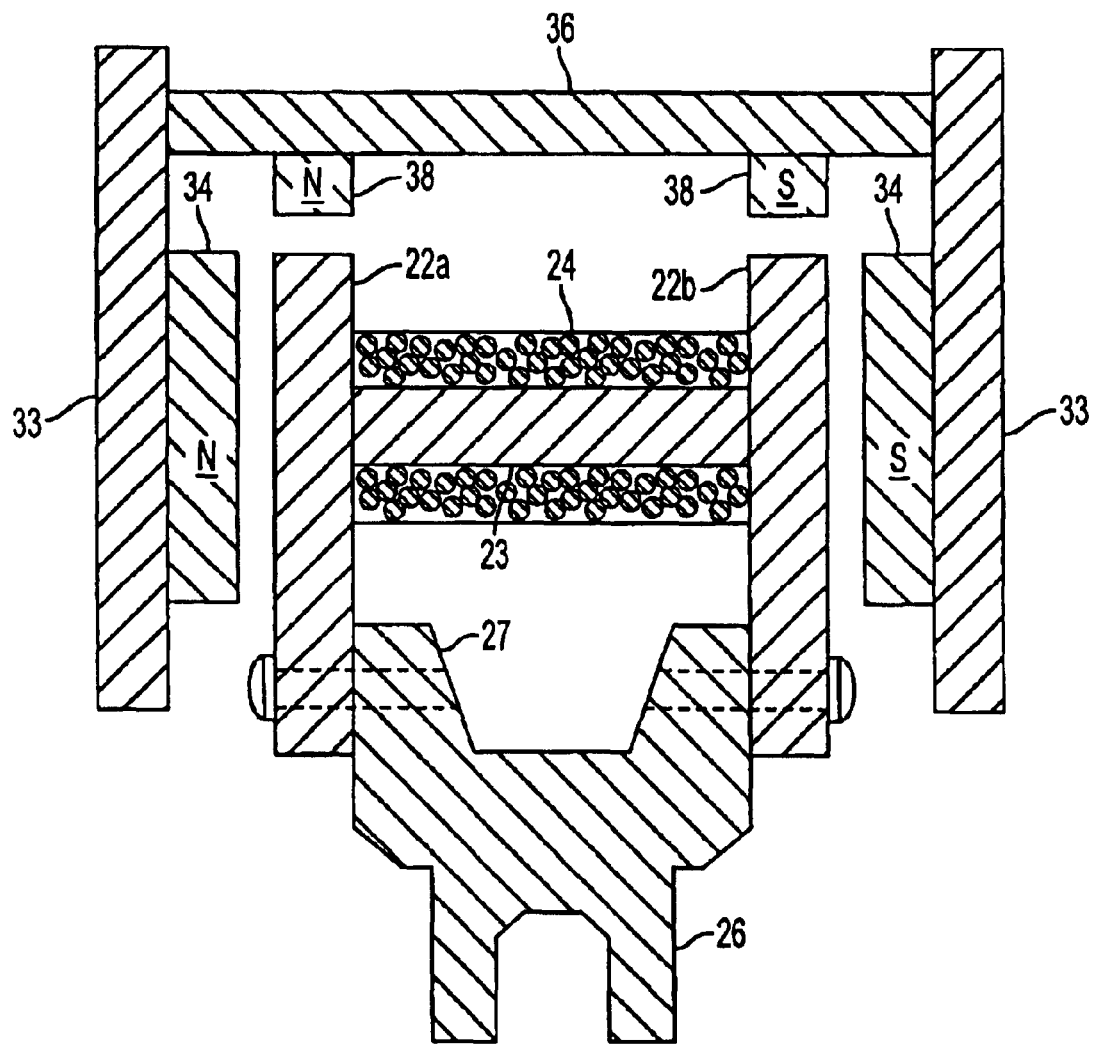
FIG. 5 is a cross section taken along dotted line plane 5—5 of FIG. 2 in accordance with the present invention.

FIG. 5 is a cross-sectional view, represented diagrammatically, of the stator and rotor rings taken at the plane along the dotted line 5—5 of FIG. 2. Seen in cross-section, the rotor ring 32 has side walls 33 that are connected by cross wall 36. The side walls and the cross wall preferably are fabricated of ferromagnetic material that forms a "back iron" upon which permanent magnets 34 are mounted, distributed in a manner as shown in FIG. 1. The back iron serves to concentrate flux in the magnets. It is to be understood that favorable motor operation can still be obtained if the back iron, and its attendant flux concentration capability, is replaced by a nonmagnetic structure.

Each side wall comprises a set of permanent magnets, the magnets of both sets in axial alignment with each other. The magnets are relatively thin dipole magnets having substantially planar pole faces. The entirety of each pole face exhibits a single magnetic polarity, opposite to the polarity at the back surface of the magnet. Adjacent magnets successively alternate in magnetic polarity along the side wall ring. The magnets on the opposing side walls that are in alignment with each other have opposite magnetic polarities. Permanent dipole magnets 38 are mounted on and distributed along the cross wall ring 36. Magnets 38 are equal in number and in alignment with the magnets 34 on the side walls. Magnets 38 have pole face surfaces along the radial air gap. Magnets 38 are of the same magnetic polarities as that of the magnets 34 that are adjacent thereto, whereby the flux produced across the radial air gap aids the flux produced across the axial air gaps. For purposes of illustration only, the adjacent pair of permanent magnets at the left is shown as north poles and the adjacent pair of permanent magnets at the right is shown as south poles at their inner surfaces.

Stator electromagnet 22 has a generally H-shaped cross-section of ferromagnetic material. Winding 24 is formed on a linking portion 23 that joins the two poles at each axial end. The stator poles are each generally rectangular in cross section. In the position shown in the drawing, each stator pole has a side pole face substantially parallel to the face of rotor magnet 34 and an upper pole face substantially parallel to rotor magnet 38. Two axial and radial air gaps are thus formed between the stator pole faces and rotor magnet faces. In operation, energization of winding 24 is appropriately switched to magnetize the pole pair with opposite magnetic polarities. Prior to the approach of the rotor to the stator electromagnet shown in the drawing, winding 24 will have been energized with a current that forms a south pole at the left pole 22a and a north pole at the right pole 22b. At an appropriate time and angular position, current may be switched off or reversed. Flux paths are thereby generated across the air gaps to produce magnetomotive force. Rotation of the rotor will next present to the stator element shown magnets of polarity opposite to those shown in the figure. Energization of the winding 24 will be switched appropriately to change the magnetic polarities formed in the stator poles to perpetuate motor torque. As rotation continues the polarities of the rotor magnets successively change and the switching of the stator winding energization is controlled accordingly to maintain motor operation. Reference is made to the aforementioned copending applications for description of appropriate switching control means. The configuration of FIG. 5 provides a large surface area at the air gaps at which torque producing flux can be focussed, while minimizing the structural volume of the motor. Ferromagnetic isolation of the stator electromagnets minimizes stray flux losses.

Figure 6:
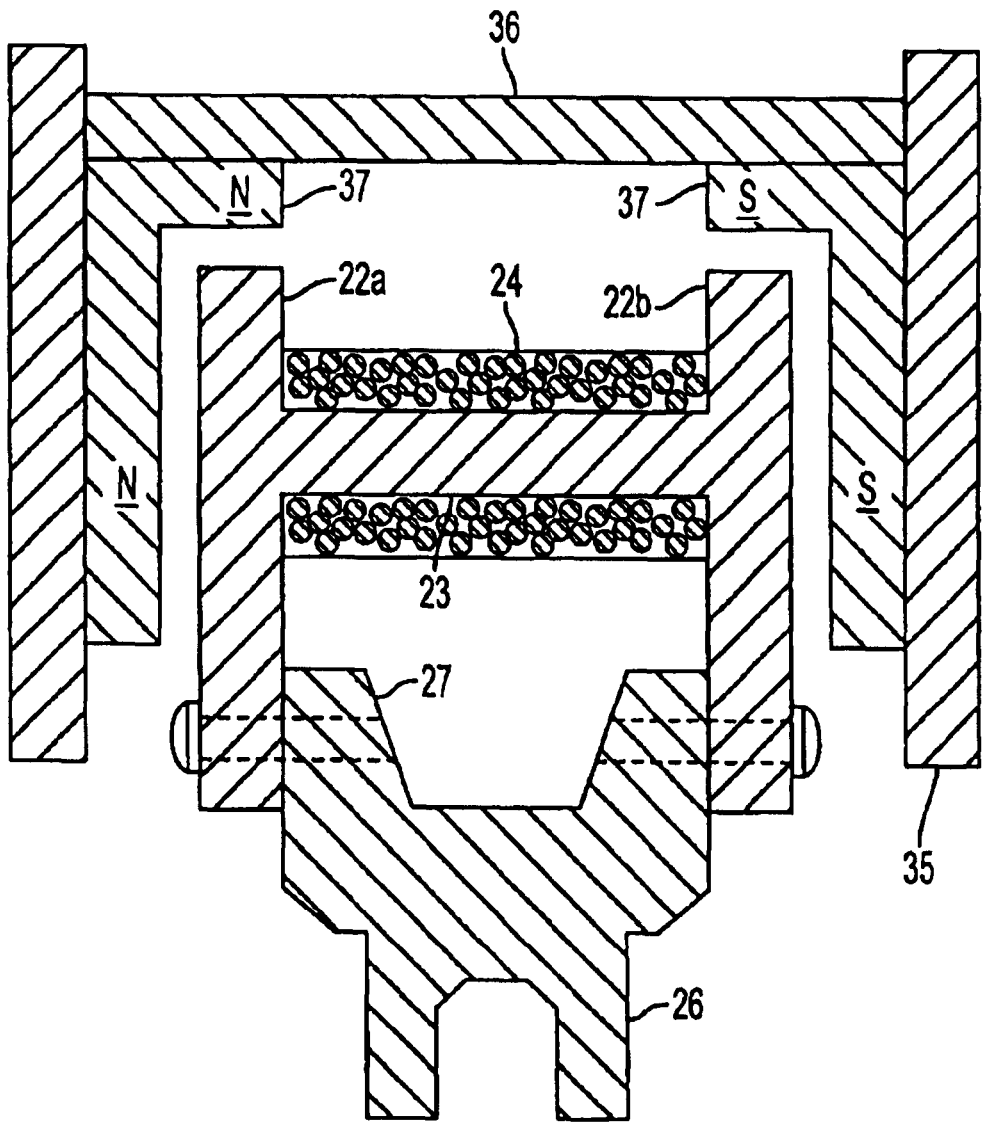
FIG. 6 is a variation of the cross section shown in FIG. 5 in accordance with the present invention.

FIG. 6 is a cross-sectional view of a variation of the structure of FIG. 5. Magnets 34 and 38 of FIG. 5, which are positioned respectively on the back iron side wall 33 and cross wall 36, have been replaced by L-shaped magnet 37. Each magnet is positioned at the corner of the side and cross wall with a first surface mounted to one of the rotor sides and a second surface mounted to the cross wall. The opposing magnets ate in axial alignment with each other and of opposite magnetic polarity.

Figure 7:
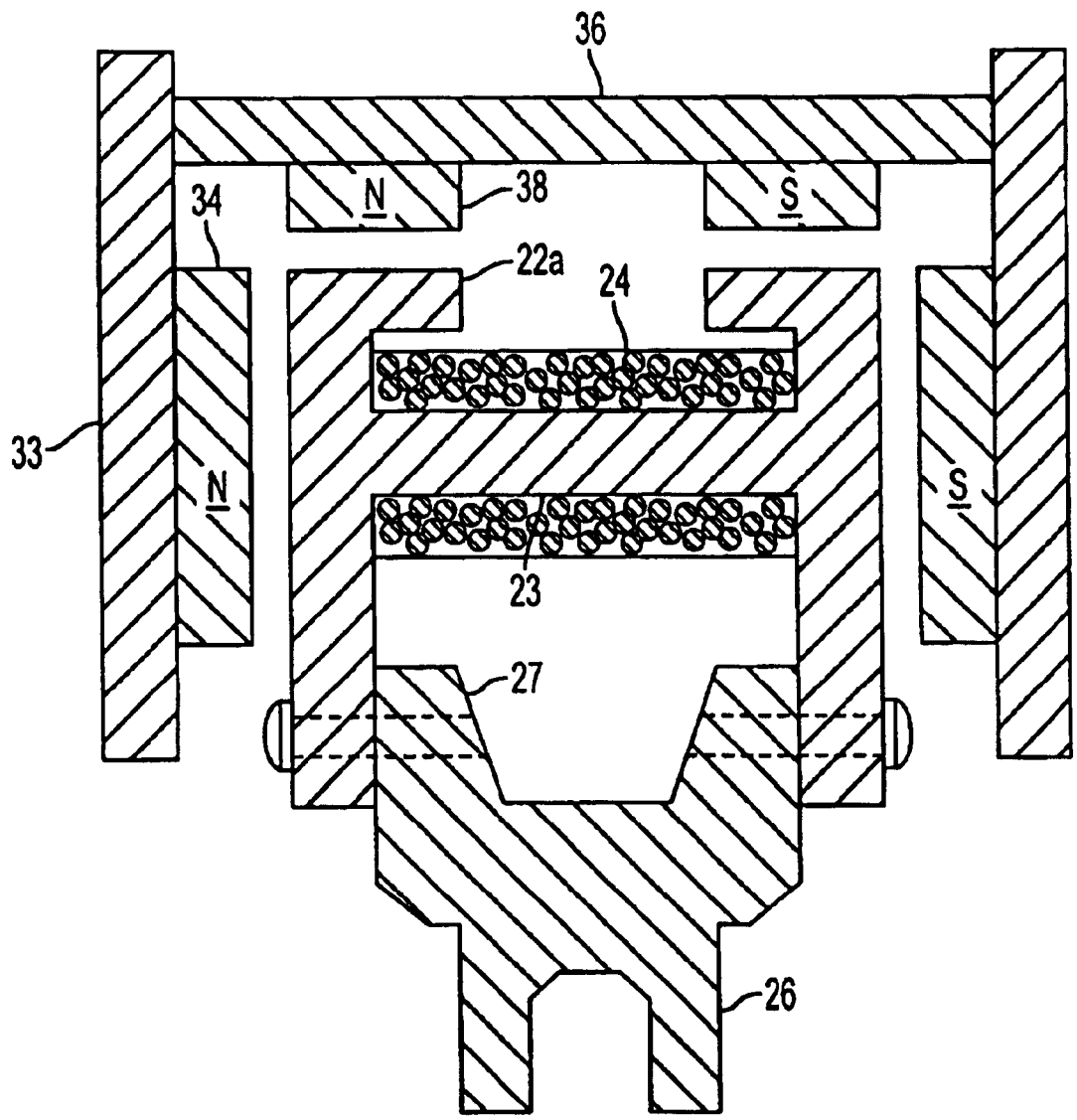
FIG. 7 is another variation of the cross section shown in FIG. 5 in accordance with the present invention.
Figure 8:
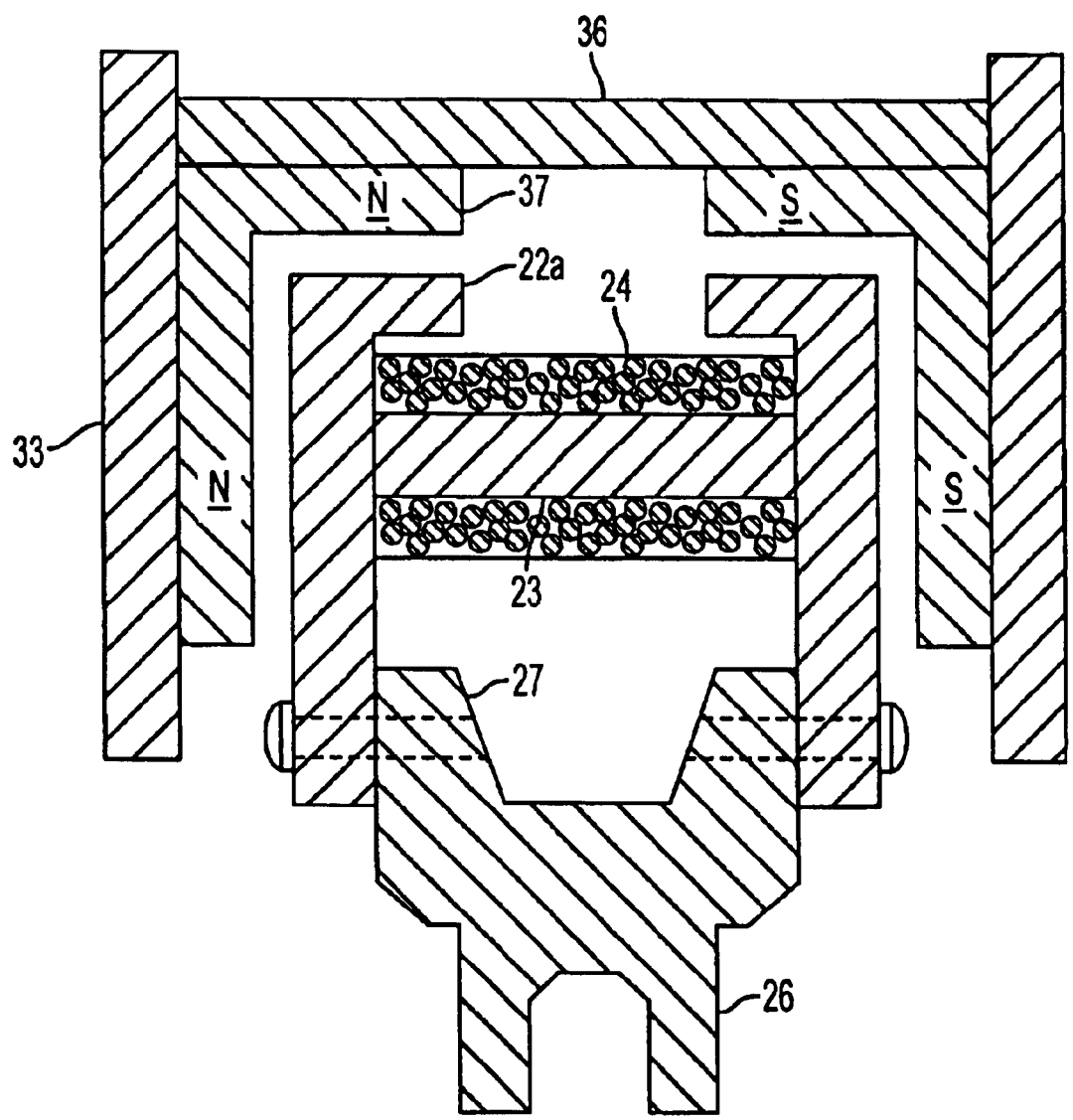
FIG. 8 is another variation of the cross section shown in FIG. 5 in accordance with the present invention.

FIG. 7 is a cross-sectional view of a variation of the structure of FIG. 5. Each stator pole face has an L-shaped cross sectional pole configuration, one portion of the "L" facing a rotor side wall across an axial air gap and the other portion of the "L" facing, at the outer stator diameter, the rotor cross wall across a radial air gap. The flux producing surface area across the radial gap is increased by the "L" extension of the stator pole and the increased length of the cross wall magnets, as compared with the configurations of FIGS. 5 and 6. FIG. 8 is a cross-sectional view of motor structure that combines features shown in FIGS. 6 and 7. Individual side wall magnets 34 and cross wall magnets 38 have been replaced by L-shaped magnets 37. The stator poles are provided with the L-shaped configuration illustrated in FIG. 7. This arrangement provides the maximum continuous flux producing path in both the rotor and stator elements.

The benefits of high torque capability and maximization of flux density distribution focussed at torque producing areas of the stator and rotor elements can be used to advantage by cascading in the axial direction a plurality of rotor/stator sets, such as those disclosed in FIGS. 5–8. One such arrangement is shown in the cross-sectional view of FIG. 9. The rotor ring 32 encompasses two U-shaped sections, each having an outer side wall 33. An inner side wall 35 is shared by both rotor walls. Cross walls 36 connect side walls 33 and 35. Each of these elements preferably forms a back iron to concentrate flux distribution for permanent magnets 34 and 38. Permanent magnets 34 are mounted on each of the inner surfaces of side walls 33 and on both surfaces of common wall 35. Permanent magnets 38 are mounted on the cross walls 36.

Preferably, the magnets are distributed along the walls in a manner similar to that described with respect to FIG. 5. The magnets on the side walls and common wall are in axial alignment with each other, adjacent magnets along each wall successively alternating in magnetic polarity. Aligned magnets on opposite surfaces of the common wall 35 are of opposite magnetic polarity from each other and of opposite magnetic polarity from the axially aligned magnets on the side walls of the respective rotor sections. Sharing of the common wall 35 by both sections of the rotor provides a highly focussed flux density distribution in aid of the magnets on either surface. Magnets 38 on the cross walls 36 are in axial alignment with the magnets 34 on the side wall surfaces and are of the same magnetic polarities as that of the adjacent magnets 34. Flux produced across the radial air gap thus aids the flux produced across the axial air gaps.

Each rotor section at least partially surrounds a stator section 20 in a manner similar to the embodiment of FIGS. 1–5. Shown in cross section, each stator electromagnet has a generally H-shaped configuration with winding 24 formed on a linking portion that joins the two poles at each axial end. A stator support ring 26 is provided for each stator ring to position and secure each of the electromagnet cores of the stator ring without direct contact with each other. Each support ring 26 is preferably constructed as described above with respect to FIG. 3. Through holes in the base portions of the stator poles facilitate attachment to support ring 26 via alignment with through holes 25 in flanges 27. Each support ring may be attached to the stationary shaft independently via through holes 29 in flanges 26. Alternatively, as these through holes in both stator sections are shown to be in alignment with each other, the through holes may be used to secure both stator rings to each other and to the shaft.

Each stator pole has a side pole face substantially parallel to the face of rotor magnet 34 and an upper pole face substantially parallel to rotor magnet 38. Two axial and radial air gaps are thus formed between the stator pole faces and rotor magnet faces in each of the rotor/stator sets. In operation, since the rotor magnets of both sets are in alignment with each other, the timing of switched energization of the windings of both stator sets occurs simultaneously to provide motoring torque as described above with respect to FIG. 5.

Figure 9:
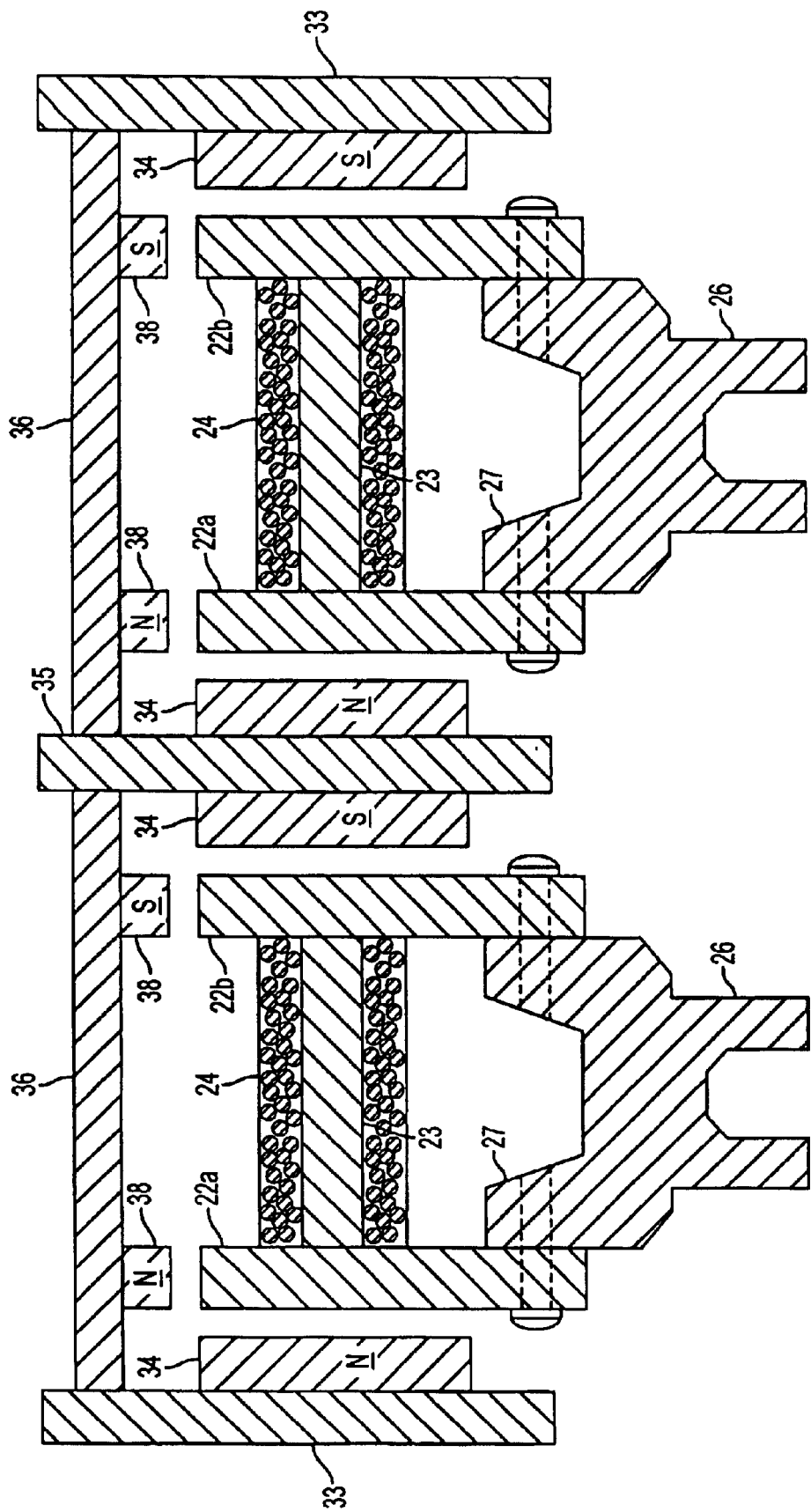
FIG. 9 is a cross-sectional view of stator and rotor elements of a cascaded motor in accordance with the present invention.
Figure 10:
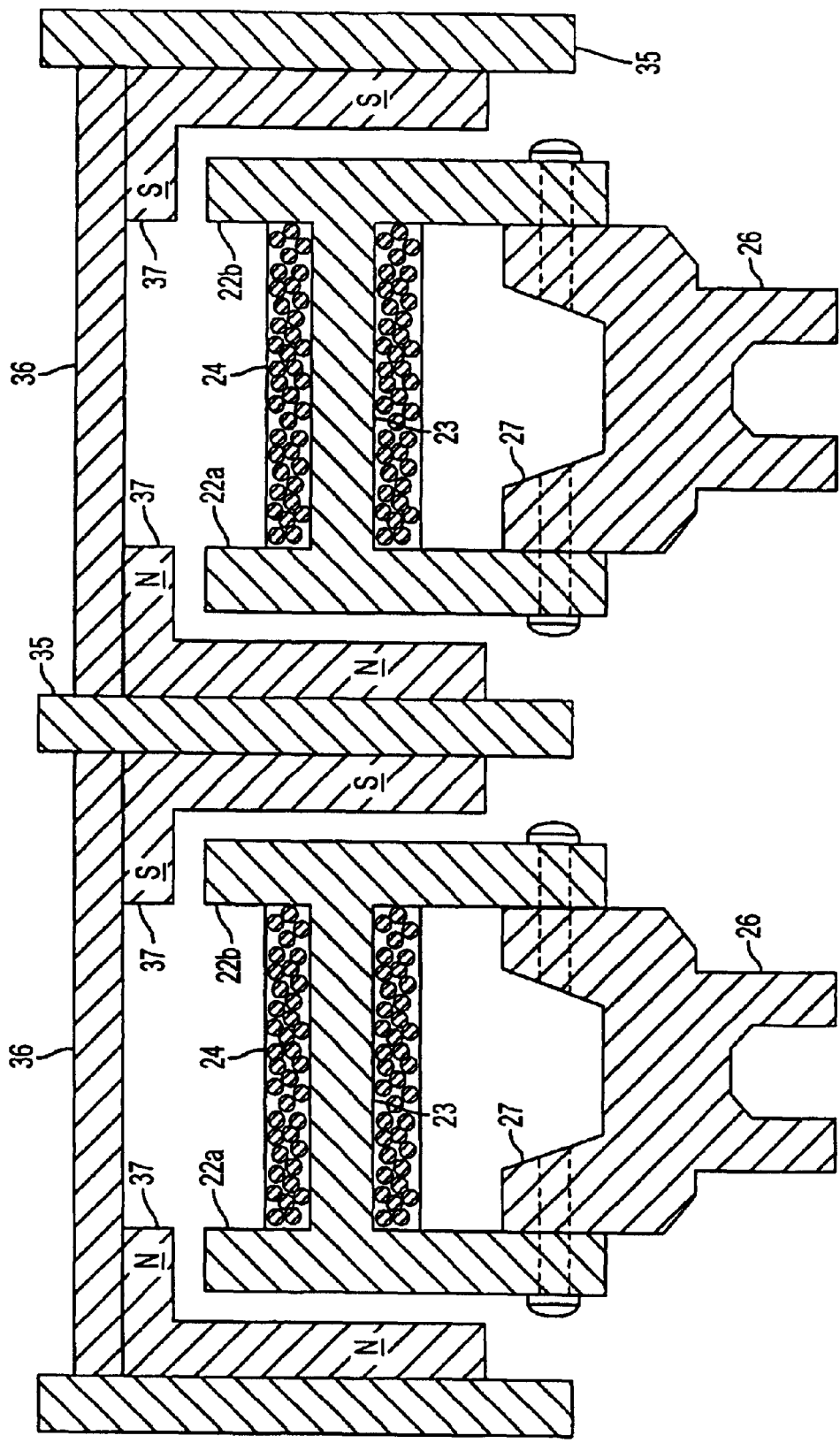
FIG. 10 is a variation of the cross section shown in FIG. 9 in accordance with the present invention.

FIG. 10 is a cross-sectional view of a variation of the cascaded structure of FIG. 9, differing therefrom with respect to the rotor magnet configuration. Four sets of L-shaped permanent magnets are circumferentially distributed and spaced from each other along each rotor ring. The magnets are mounted at the corners between the side walls and cross walls. As illustrated, magnets with north magnetic poles are located at the left hand corners of each rotor section and magnets with south magnetic poles are located at the right hand corners. Each set of four magnets is in axially alignment and successively alternate in polarity along the rotor ring.

Figure 11:
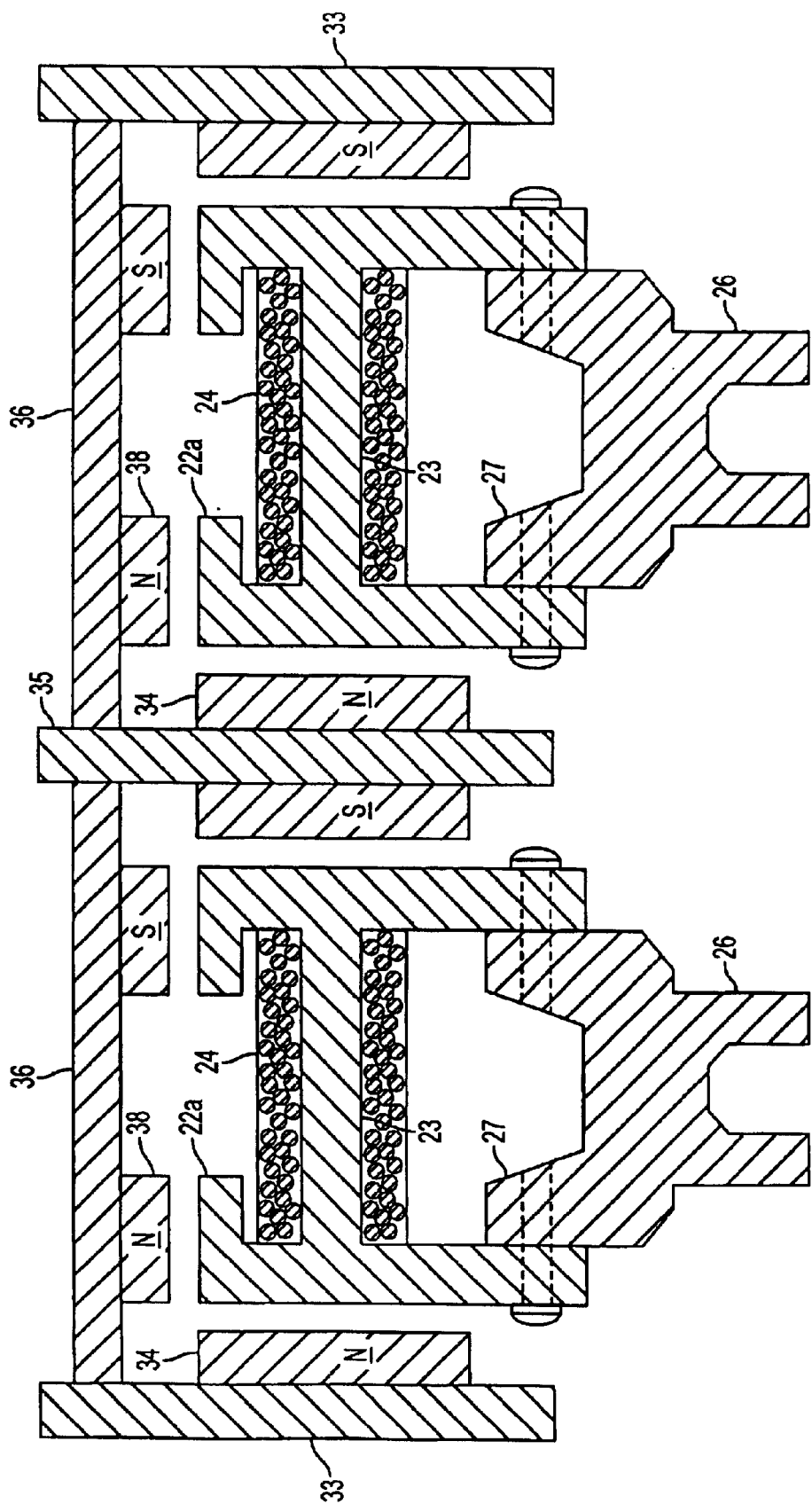
FIG. 11 is another variation of the cross section shown in FIG. 9 in accordance with the present invention.

FIG. 11 is a cross-sectional view of a variation of the cascaded structure of FIG. 9. Each stator pole face has an L-shaped cross sectional pole configuration, one portion of the "L" facing a rotor side wall across an axial air gap and the other portion of the "L" facing, at the outer stator diameter, the rotor cross wall across a radial air gap. The axial length of rotor magnets 38 may be coextensive with the axial length of the stator pole surface along the radial air gap. The flux producing surface area across the radial gap is increased by the "L" extension of the stator pole and the increased length of the cross wall magnets, as compared with the configurations of FIGS. 9 and 10.

Figure 12:
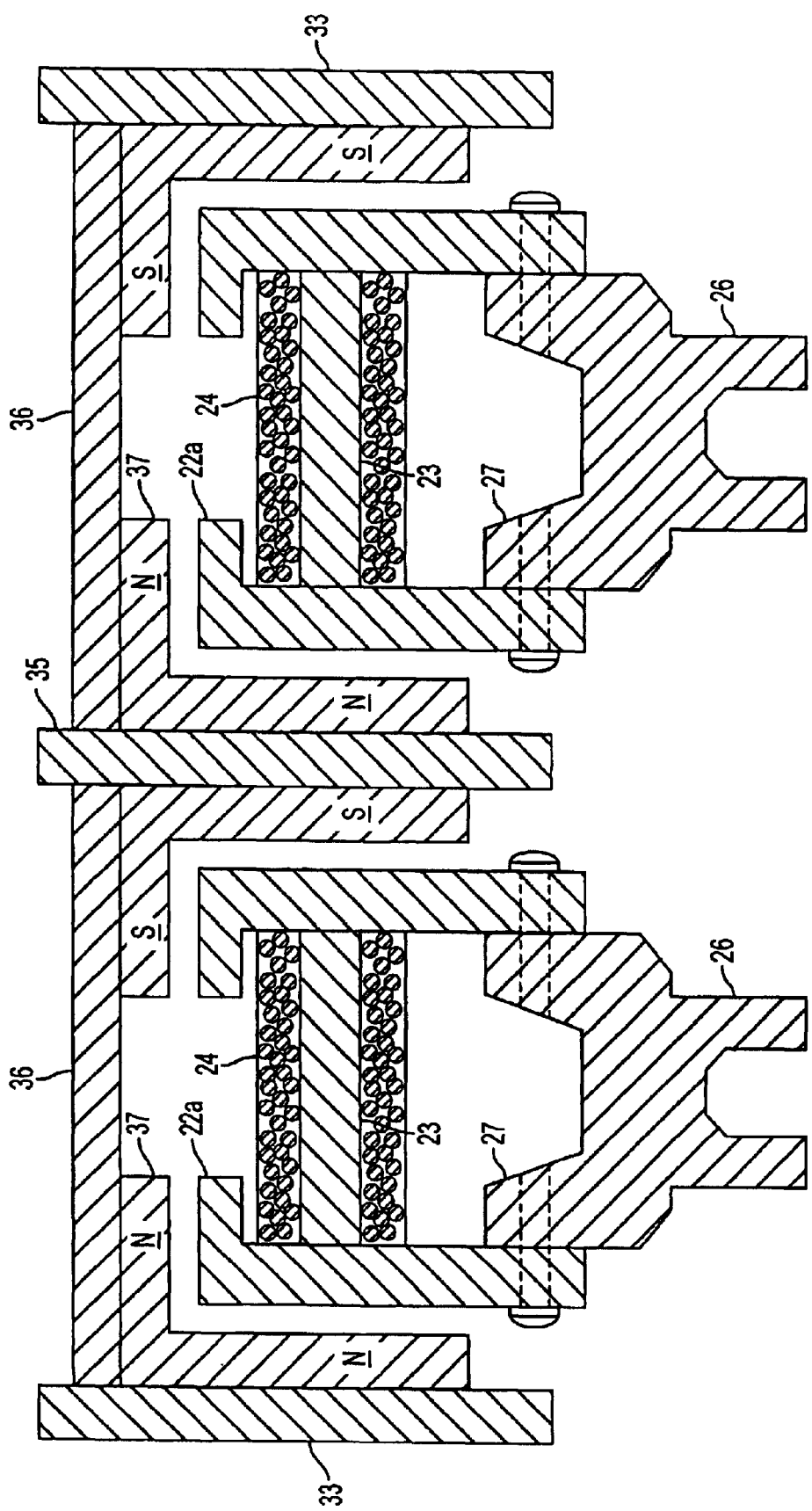
FIG. 12 is another variation of the cross section shown in FIG. 9 in accordance with the present invention.

FIG. 12 is a cross-sectional view of a cascaded arrangement that combines features of the structures illustrated in FIGS. 10 and 11. Individual side wall magnets 34 and cross wall magnets 38 of FIG. 11 have been replaced by L-shaped magnets 37 and arranged in the rotor in a manner as described with respect to FIG. 10. The stator poles are provided with the L-shaped configuration as described with respect to FIG. 11. This arrangement provides the maximum continuous flux producing path in both the rotor and stator elements for the cascaded arrangements.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, any number of rotor/stator sets may be cascaded along the axis of rotation. The rotor/stator sets may be separated from each other and the rotor sections need not share a common wall. Although, as illustrated, the rotor magnets in each rotor section are respectively in axial alignment, they need not be aligned with the magnets in one or more other separated sections. The timing of the switched energization of the stator windings for each set will be different if the magnets of one set are not aligned with the magnets of another set. The offset of alignment between the sets and timing of the switched winding energization can be specifically established for each set, for example, to smooth cogging torque effects.

What is claimed is:

1. A cascaded rotary electric motor comprising:
    a rotor comprising a plurality of annular rings configured about an axis of rotation and axially adjacent each other, each ring having disposed therein a plurality of permanent magnets; and
    a stator comprising a plurality of annular rings, each in concentric alignment with, and at least partially surrounded by, a respective one of the rotor rings, each stator ring comprising separated electromagnet core segments disposed coaxially about the axis of rotation; wherein
        two axial air gaps are formed between each stator ring and its respective rotor ring;
        each rotor annular ring has a U-shaped cross section with two ferromagnetic side walls connected by a cross wall, an inner surface of each of the side walls having permanent magnets mounted thereon, the mounted permanent magnets having surfaces facing one of the axial air gaps; and wherein the axially adjacent rotor annular rings are in contact with each other and share a common side wall.

2. A rotary electric motor as recited in claim 1, wherein each stator electromagnet core segment comprises a pair of poles integrally aligned by a linking portion, the poles having respective pole surfaces facing the axial air gaps, and further comprising windings formed on the linking portions of the core segments.

3. A rotary electric motor as recited in claim 2, wherein the alignment of the pair of poles is in a direction substantially parallel to the axis of rotation.

4. A rotary electric motor as recited in claim 2, wherein the permanent magnets are distributed along the rotor side walls and the permanent magnets on opposite side walls of each ring are aligned with each other in a direction substantially parallel to the axis of rotation and each pair of axially aligned permanent magnets are of opposite magnetic polarity.

5. A rotary electric motor as recited in claim 1, wherein the permanent magnets on the surfaces of the common side wall are aligned with each other in a direction substantially parallel to the axis of rotation and are of opposite magnetic polarity.

6. A rotary electric motor as recited in claim 1, wherein the rotor permanent magnets on each side wall are separated from contact with each other; and each permanent magnet is a magnetic dipole having one magnetic polarity at a surface at the air gap and the opposite magnetic polarity at a surface opposite from the air gap, thereby forming a magnetic polar orientation in the axial direction.

7. A rotary electric motor as recited in claim 2, wherein the stator further comprises a non-ferromagnetic support structure to which the core segments are affixed without ferromagnetic contact with each other.

8. A rotary electric motor as recited in claim 2, wherein permanent magnets are circumferentially distributed on an inner surface of at least one rotor cross wall, the cross wall permanent magnets having surfaces facing an annular radial air gap that separates the rotor cross wall from a stator annular ring; and each stator pole has a surface facing the radial air gap.

9. A rotary electric motor as recited in claim 8, wherein the permanent magnets on the cross wall comprise two sets of magnets, the magnets of each set being adjacent to, and in axial alignment with, permanent magnets on a respective side wall; and adjacent side magnets and cross wall magnets are of the same magnetic polarity.

10. A rotary electric motor as recited in claim 9, wherein the permanent magnets on the cross wall are integral with the adjacent permanent magnets on the respective side walls and are L-shaped in cross-section.

11. A rotary electric motor as recited in claim 8, wherein each said stator pole has a general rectangular cross-sectional configuration.

12. A rotary electric motor as recited in claim 8, wherein each said stator pole has an L-shaped cross-sectional configuration.

* * * * *